US009660964B2

(12) United States Patent
Asiedu

(10) Patent No.: US 9,660,964 B2
(45) Date of Patent: May 23, 2017

(54) COMMUNICATIONS ROUTER

(75) Inventor: Edward Yaw Asiedu, Brentwood (GB)

(73) Assignee: BYTEBORNE TECHNOLOGIES LIMITED, St Albans (GB)

(*) Notice: Subject to any disclaimer, the term of this patent is extended or adjusted under 35 U.S.C. 154(b) by 227 days.

(21) Appl. No.: 12/809,168

(22) PCT Filed: Dec. 19, 2008

(86) PCT No.: PCT/GB2008/051213
§ 371 (c)(1),
(2), (4) Date: Jun. 18, 2010

(87) PCT Pub. No.: WO2009/081202
PCT Pub. Date: Jul. 2, 2009

(65) Prior Publication Data
US 2010/0274861 A1  Oct. 28, 2010

(30) Foreign Application Priority Data
Dec. 20, 2007  (GB) .................................. 0724902.2

(51) Int. Cl.
G06F 15/16 (2006.01)
H04L 29/06 (2006.01)
H04L 12/58 (2006.01)

(52) U.S. Cl.
CPC .......... H04L 63/0421 (2013.01); H04L 51/28 (2013.01); H04L 51/066 (2013.01)

(58) Field of Classification Search
CPC ... H04L 12/585; H04L 63/0421; H04L 51/28; H04L 51/066
(Continued)

(56) References Cited

U.S. PATENT DOCUMENTS 6,154,781 A * 11/2000 Bolam et al. ................. 709/238
6,175,619 B1 * 1/2001 DeSimone ........ H04M 3/42008
                                                    348/14.08
(Continued)

FOREIGN PATENT DOCUMENTS

EP        1 333 637      8/2003
WO     WO 00/51323 A1   8/2000
(Continued)

OTHER PUBLICATIONS

Gulcu, C. et al., "Mixing Email with Babel", *Proceedings of the Symposium on Network and Distributed System Security*, pp. 2-16, Jan. 1996.

*Primary Examiner* — June Sison
*Assistant Examiner* — Steven Nguyen
(74) *Attorney, Agent, or Firm* — Jacqueline F. Mahoney; Judy M. Mohr; McDermott Will & Emery LLP

(57) ABSTRACT

Communications router for anonymously routing messages between a source communication device (200) and respondent communication devices (213,214,215,2116,217,218). A source storage means (203) is provided for storing the communication identifiers for the source communication device (200) and a predetermined subject identifier for designating messages associated therewith. A respondent storage means (203) is provided for storing the communication identifiers for each respondent communication device (213,214,215,2116,217,218), along with a unique tag identifier assigned thereto. A first message handler (202,204,205, 206) selects received messages from the respondent communication devices (213,214,215,2116,217,218), attaches the appropriate tag identifier, and transmits the message to the source communication device (200). A second message handler (202,201) receives messages from the source communication device (200) and transmits them to the appropriate respondent communication devices (213,214,215, 
(Continued)

2116,217,218) based on the predetermined subject identifier and the tag identifier contained in the message.

17 Claims, 1 Drawing Sheet

(58) Field of Classification Search
   USPC ........................................................ 709/206
   See application file for complete search history.

(56) References Cited

U.S. PATENT DOCUMENTS

| | | |
|---|---|---|
| 6,393,423 B1* | 5/2002 | Goedken |
| 2003/0084103 A1* | 5/2003 | Weiner et al. ................ 709/205 |
| 2003/0187930 A1* | 10/2003 | Ghaffar et al. ............... 709/205 |
| 2004/0117428 A1* | 6/2004 | Surma et al. ................. 709/200 |
| 2005/0259638 A1* | 11/2005 | Burg .................. H04L 12/1813 370/352 |
| 2006/0194595 A1* | 8/2006 | Myllynen et al. ............ 455/466 |
| 2008/0021884 A1* | 1/2008 | Jones et al. ........................ 707/3 |
| 2008/0162640 A1* | 7/2008 | Boss et al. .................... 709/206 |
| 2008/0235336 A1* | 9/2008 | Stern et al. ................... 709/206 |
| 2008/0248801 A1* | 10/2008 | Fletcher et al. ........... 455/435.2 |
| 2009/0125489 A1* | 5/2009 | Barker et al. ...................... 707/3 |
| 2009/0325609 A1* | 12/2009 | Rosen et al. ................. 455/466 |

FOREIGN PATENT DOCUMENTS

| | | |
|---|---|---|
| WO | WO 02/082838 A1 | 10/2002 |
| WO | WO 2006/003069 A | 1/2006 |
| WO | WO 2008/028227 A1 | 3/2008 |

\* cited by examiner

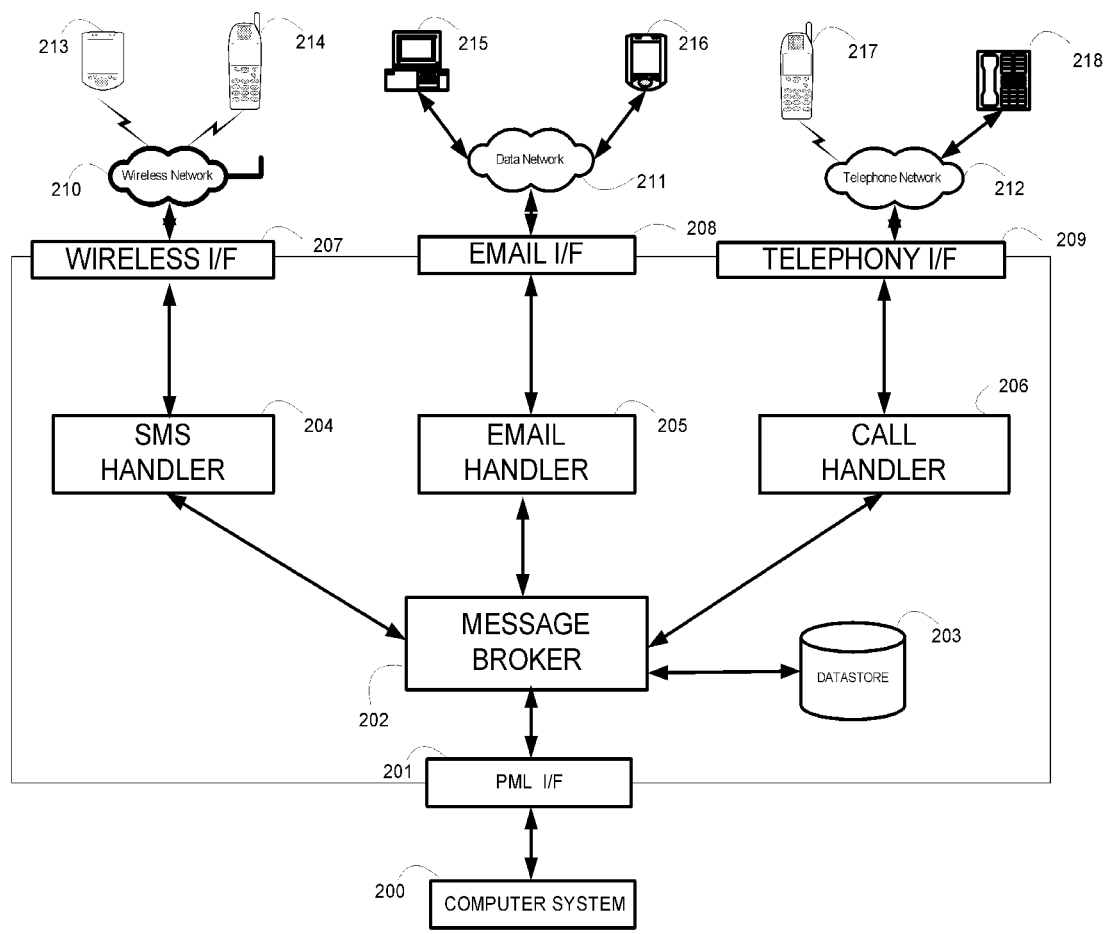

COMMUNICATIONS ROUTER

This application is a U.S. National Stage of International Patent Application No. PCT/GB2008/051213, filed Dec. 19, 2008, which claims the benefit of Great Britain Patent Application No. 0724902.2, filed Dec. 20, 2007, all of which are hereby incorporated by reference in their entirety.

The present invention relates to a communications router and, in particular, but not exclusively a router for allowing anonymous communications between heterogeneous communication devices.

Known communications devices include plain telephones, telex, facsimile machines, cellular phones, email, voice/video over IP, SMS messaging and instant messaging. All these forms of communications device have two requirements in common in order to operate.

Firstly, the transmitting and receiving terminals of each communication type must have communications identifiers, such as a telephone number or email address, which identifies them in their respective communications network. For instance, a transmitting terminal must signal the correct communications identifier for the destination of the electronic pulses. As an example, to connect a telephone call, one telephone transmits a destination telephone number to the telephone exchange, which in turn connects this to the destination telephone.

Secondly, the transmitting and receiving terminals must be compatible with each other. That is, the transmitting terminal must send an electronic message that is capable of being delivered to, and interpreted by, the receiving terminal. For example, a standard telephone cannot communicate with an email account, as the telephone cannot transmit an email address to the exchange and the voice signals cannot be interpreted by a standard email server.

Due to the above requirements, problems arise when effecting anonymous communications. In this regard, when one communications device initiates a communication, it is possible for this device to appear "unidentified" by preventing its own identifier from being transmitted to the receiver device. An example is where the display of a telephone in receipt of a call does not show the number of the calling telephone. However, under such circumstances, it is not possible for the receiver device to reply to the communications device that was the source of the initial communication. This is because the source device has prevented its own communications identifier from being transmitted to the receiver device. In some instances, this is seen as a necessary control of the communication between devices. Nevertheless, in other instances, it would be useful to enable a receiver device to respond to the source device.

A further problem arises relating to the need for compatibility between devices. In this regard, in order for a receiver device to respond to the source device, it is necessary for the receiver device to also have information regarding the format of the communication the source device is willing to accept, as well as the ability to send a communication in this format. This is problematic as the receiver device does not know the identity of the source device or have its communications identifier, and therefore has no indication of the required format. Although the source communication itself will be in one particular format, it is not always the case that the source device is willing to accept reply communications in the same format. For instance, to simplify handling of subsequent communications, a source device responsible for transmitting a source telephone communication may wish to receive response communications by email. However, to achieve this, the source device must divulge their email address which sacrifices its anonymity.

Moreover, in some circumstances, it may also be desirable to allow the source device to accept reply communications from a variety respondent devices using different communication formats. To achieve this, it is necessary for the source device to provide and maintain network interfaces, each with their own communications identifier and their associated handling systems, for each format of communication the source device wishes to receive. The source device must also divulge all of the communications identifiers which can be used. This not only sacrifices anonymity, but also is expensive and complex to manage and maintain.

The present invention seeks to overcome the problems associated with the known communication systems and devices.

According to an aspect of the present invention, there is provided a communications router for anonymously routing messages between a source communication device and one or more respondent communication devices, wherein the messages contain a subject identifier and where the router and the communication devices each have at least one communication identifier, the router comprising: a source storage means for storing the at least one communication identifier for the source communication device and a predetermined subject identifier for designating messages associated with the source communication device; a respondent storage means for storing the at least one communication identifier for each of one or more respondent communication devices and assigning a unique tag identifier to each respondent communication device; a first message handler for selecting received messages containing the predetermined subject identifier originating from the one or more respondent communication devices and attaching the appropriate tag identifier to each of the selected messages based on its origin, and transmitting the selected message to the source communication device using its at least one communication identifier; and a second message handler for receiving messages from the source communication device and transmitting them to the appropriate respondent communication device, using the stored communication identifiers, based on the predetermined subject identifier and tag identifier contained in the message.

In this way, messages can be transmitted between a source communication device and one or more respondent communication devices under the control of the router and without either device requiring knowledge of the other's communication identifier. This allows truly anonymous two way communication. Furthermore, the communication devices are still able to control the messages that they receive. For example, as messages to the source device are determined based on a predetermined subject identifier set by the source device, if a source device no longer wishes to receive messages relating to a particular subject, it can simply instruct the router to remove that particular subject identifier from the subject source storage means. As a consequence of this, respondent devices are no longer able to contact the source device on this subject. The source device may, however, be accepting messages relating to a different subject. This allows the source device to control communications to it and prevent receipt of messages that are not replies to active subjects it is dealing with.

Conveniently, the router further comprises a format identifier storage means for storing format identifier data indicating the format of messages associated with a communications device. In this way, the router stores information on the appropriate format for transmitting messages to the source or respondent communications devices.

Conveniently, there is further provided conversion means for converting messages transmitted between the source device and the appropriate respondent communication device into a format compatible with the communication device receiving the message based on the stored format identifier for that communication device. In this way, the router can transmit to a communications device in its native format without requiring that the communications device sending the transmission knows the appropriate format for the recipient. This enhances anonymity as communications devices cannot easily identify what type of communications devices a respondent is using. Furthermore, this also allows a source device to receive replies to a source message in one specific format, for example email, from multiple different format respondent communications devices. This simplifies reply message handling.

Conveniently, the conversion means converts messages incoming to the router into a mark-up language format. This allows the router to easily process incoming messages before their conversion into the appropriate format for transmission to another communications device.

Conveniently, one or more of the communication devices are located on one or more external networks, the router comprising at least one interface for connecting with said one or more external networks.

Conveniently, the one or more external networks comprise at least one of the following: a GSM wireless network, a data network, and a telephone network.

Conveniently, the router comprises an interface for connecting with a source device in the form of a computer system.

Conveniently, the messages comprise at least one of the following: a voice message, an electronic mail, and a text message.

Conveniently, the first message handler comprises a first incoming message handler for determining the communications identifier for the one or more respondent communications devices from incoming messages from the one or more respondent and causing said respondent storage means to store said communications identifier with the assigned unique tag identifier.

Conveniently, the second message handler comprises a second incoming message handler for determining the communications identifier for the source communications device from incoming messages from the source communications device and causing said source storage means to store said communications identifier with the predetermined subject identifier.

Conveniently, a data store forms said source storage means and said respondent storage means.

Conveniently, a message broker forms said first and second message handler.

According to a further aspect of the present invention, there is provided a method for anonymously routing messages between a source communication device and one or more respondent communication devices, the messages having a subject identifier and the communication devices each having at least one communication identifier, comprising the steps of:—storing the at least one communication identifier for the source communication device and a predetermined subject identifier for designating messages associated with the source communication device; storing the at least one communication identifier for each of one or more respondent communication devices and assigning a unique tag identifier to each respondent communication device; selecting received messages containing the predetermined subject identifier originating from the one or more respondent communication devices and attaching the appropriate tag identifier to each of the selected messages based on its origin, and transmitting the selected message to the source communication device using its at least one communication identifier; and receiving messages from the source communication device and transmitting them to the appropriate respondent communication device, using the stored communication identifiers, based on the predetermined subject identifier and tag identifier contained in the message.

Conveniently, the method further comprises the step of storing format identifier data indicating the format of messages associated with a communications device.

Conveniently, the method further comprises the step of converting the messages transmitted between the source device and the appropriate respondent communication device into a format compatible with the communication device receiving the message based on the stored format identifier for that communication device.

Conveniently, the messages incoming to the router are converted into a mark-up language format.

According to a further aspect of the present invention, there is provided a communications system for anonymously routing messages between a source communication device and one or more respondent communication devices, wherein the messages contain a subject identifier and the router and communication devices each have at least one communication identifier, the system comprising: a router comprising storage means for storing the at least one communication identifier for the source communication device and a predetermined subject identifier for designating messages associated with the source communication device; means for providing the one or more respondent communication devices with said predetermined subject identifier and the at least one communication identifier for said router; the router comprising means for detecting messages originating from said one or more respondent communication devices and selecting received messages containing the predetermined subject identifier; the router comprising means for storing the at least one communication identifier for each of one or more respondent communication devices and assigning a unique tag identifier to each respondent communication device; and the router comprising means for attaching said respective tag identifier to each selected message based on its origin respondent communication device and transmitting the message to said source communication device using the stored at least one communication identifier for the source communication device.

Conveniently, the communications system further comprises the router having means for detecting a reply message originating from the source communication devices and being directed to a particular respondent communication device, and determining the predetermined subject identifier and unique tag identifier for the reply message; and the router having means for transmitting the reply message to the appropriate respondent communication device, using the stored communication identifiers, based on the determined predetermined subject identifier and tag identifier.

An embodiment of the present invention will now be described by way of example with reference to the following drawing in which:—

FIG. 1 shows a schematic of an anonymous communication router according to a preferred embodiment of the present invention, together with its connections to various external communications networks.

FIG. 1 shows a communications router according to a preferred embodiment of the present invention for routing messages between a source communication device and one or more respondent communication devices. The source communication device may, for example, be one of a computer 200, 215, a mobile phone 214, 217, a telephone 218, or a PDA 213, 216. The messages which are to be sent between the communication devices 200, 213, 214, 215, 216, 217, 218 contain a subject identifier, for example a subject or topic reference relating to the messages communicated between the source communications device and the respondent communications device.

Each of the communication devices 200, 213, 214, 215, 216, 217, 218 has a communication identifier which is unique to the device and identifies it on its respective network. Such communication identifiers include, for example, a mobile telephone number, a land line number, an email address or an IP address.

Furthermore, the router itself is provided with a communication identifier for each communications network it is connected to. In this connection, in the example shown in FIG. 1, the router is provided with a wireless network interface 207, an email network interface 208, a telephone network interface 209, and a markup language interface 201 for connecting the router to various communication networks. Each of these interfaces have a communications identifier which allows incoming messages from the various communication devices 200, 213, 214, 215, 216, 217, 218 to be directed to the router. Furthermore, these interfaces allow for the transmission of outgoing messages to the associated communications devices.

In this connection, interfaces 201, 207, 208 and 209 connect the router to various external networks, namely a wireless 210, data 211 and telephone network 212, respectively. The telephony interface enables the integration of the router with an existing Private branch Exchange (PBX) or the Public Switched Telephone Network (PSTN) via hardware expansion boards. The telephony interface functions like a PBX by placing outbound calls and picking up inbound calls. The telephony interface also provides an Interactive Voice Response (IVR) interface for complex inbound and outbound call handling requirements. The Wireless interface is activated for sending and receiving SMS transmissions or wireless data. The wireless interface supports multiple codecs and has an antenna, multiple GSM channels and SIM card slots which can be used with cards from any GSM wireless network provider. The markup language interface 201 is a computer network interface and allows connection of the router directly to a computer system 200 using the mark up language format.

As will be described in further detail below, the message broker 202 is used to control and direct messages between communications devices, and data store 203 is used by the message broker 202 to store various information about the communications devices using the system and the messages being transmitted. The router is provided with a number of format specific message handlers 204, 205, 206 which process incoming and outgoing messages depending on their format. The message broker 202 and the format specific message handlers 204, 205, 206 operate together to handle incoming and outgoing messages. In the case of the computer system 200, a separate format specific message broker is not required because this device uses the router's native data format.

Before anonymous two-way communication can be enabled, the source communication device, which may be any one of the communication devices 200, 213, 214, 215, 216, 217, 218 sends a source registration message to the communications router. When the registration message is received by the communications router, the router determines the communication identifier of the source communication device and the subject identifier of the registration message. The router then stores this communication identifier and subject identifier in a source storage means, provided in the form of data store 203.

The source device can then make the subject identifier available to the other respondent communication devices by various means. For example, the source device may publish the subject identifier, for instance on a web site, bulletin or advert, or may instruct the router to notify registered respondent devices directly. The respondent communication devices are also provided with the appropriate communications identifier(s) for the various router interfaces.

When a respondent communication device, which may be any one of the communications devices 200, 213, 214, 215, 216, 217, 218, wishes to respond to the source device, it transmits a response message to the router containing the subject identifier relevant to the particular message or topic it is responding to. The respondent communication device is able to direct the response message to the router using the communications identifier appropriate for the particular network and data format used by the respondent communication device.

When the router receives a response message from a respondent communications device, the message broker 202 and, where necessary, format specific message handler 204, 205, 206, determines the communication identifier of the respondent communication device and stores this in data store 203. The message broker 202 also assigns a unique tag to the message which corresponds to the respondent communication device. The message broker 202 also determines the subject identifier appended to the response message and matches this with the corresponding subject identifier stored in the data store 203 for the source communications device. In this regard, when a matching subject identifier is found, the message broker determines the associated communication identifier of the source communication device and effects the transmission of the reply message to the source communication device.

In this connection, when transmitting the reply message to the source communication device, the message broker 202 firstly appends the unique tag to the message designating the respective communication device responsible for that particular reply message. The message broker 202, and (where necessary) a format specific message handler, then directs the message, including the unique tag and subject identifier, to the appropriate source communication device using the communication identifier determined using the subject identifier.

Once a response message is received by the source communication device, a further reply message can be sent back to the respondent communication device from the source communication device. To do this, the source communication device sends a message to the router comprising the unique tag and the subject identifier contained in the reply message. On receipt of this further reply message, the message broker 202 reads the unique tag and the subject identifier from the message, and routes the message to the appropriate respondent communication device by comparing the unique tag and subject identifier with those stored in data store 203 for the respondent communication device.

With the above example, messages can therefore be sent back and fourth between the source and respondent communication devices, via the router, based on a particular subject identifier. Importantly, only the communications identifiers for the router need to be known to the communication devices, and therefore messages can be sent anonymously without either device needing to divulge its communications identifier to the other.

In this embodiment, the source and respondent communication devices are not necessarily compatible and may use different communication formats. For example, telephone 218 can send a message to computer 215. To allow for messages to be transmitted between heterogeneous devices, the format specific message handlers 204, 205, 206 include conversion means for converting messages into the appropriate format for whichever communication device the message is being sent to.

In the embodiment shown, rather than converting the message directly into the format appropriate for the source communication device, the format specific message handlers converts an incoming message into a mark-up language format. This mark-up language is a XML notation for interaction with the router. For example, if telephone 218, acting as a respondent communication device, is to send a reply message to an email account on computer 215, the appropriate format specific message handler, in this case call handler 206, receives the voice message reply from telephone 218 and converts it into the mark-up language format. The message broker 202 then receives this message and attaches the assigned tag identifier for telephone 218. As is described above, the message broker 202 determines that the message is to be sent to computer 215 based on the reply message's subject identifier. Based on this, the message broker 202 then forwards the converted message (in mark-up language format) to email handler 205, which converts the converted message (in mark-up language format) into an email format before it is sent by email interface 208 to computer 215.

Further examples of the router in operation will be described below.

Message Transmission from a Directly Connected Computer System to an External Communications Device An example of message transmission from computer system 200, which is directly connected to the router via computer network interface 201, to one or more external communications devices, is described below. In this example, the router is set to distribute the source message from the computer system 200 to all applicable external communications devices connected through its various interfaces, based on a predetermined destination identifier. For example, the predetermined destination identifier may designate groups of external communications devices that have registered with the router to receive messages relating to a particular subject, or that are known to be used by users of a particular demographic of interest.

(1) Computer system 200 sends the source message in the mark-up language format, and containing a subject reference and message payload, to the router via markup language interface 201.

(2) The message is received from markup language interface 201 and is sent to the message broker 202, which determines the communications identifier of computer system 200 and copies the message, together with information regarding the communications identifier and the subject identifier, to the data store 203.

(3) The message broker 202 determines the predetermined destination identifier for the message and, based on this, transmits the message to any combination of the SMS Handler 204, E-mail Handler 205, and Call Handler 206 required for transmission of the message to the relevant external communications devices.

(4) If the predetermined destination identifier includes an SMS identifier, the message is converted by the SMS Handler 204 to an SMS message that is transmitted to the destination device 213 or 214 from the Wireless Interface 207 via the Wireless Network 210.

Similarly, if the predetermined destination identifier includes an email identifier, the message is converted by the E-mail Handler 205 to an email message that is transmitted to the destination device 215 or 216 from the E-mail Interface 208 via the Data Network 211.

Similarly, if the predetermined destination identifier includes a Voice Call identifier, the message is converted by the Call Handler 206 to voice signals that are transmitted to the destination device 217 or 218 from the Telephony Interface 209 via the Telephone Network 212.

Message Transmission from an External Communications Device to a Directly Connected Computer System An example of message transmission from an external communications device to computer system 200, which is directly connected to the router via computer network interface 201, is described below. This example corresponds to a situation in which an external communications device wishes to respond to a source message sent by the computer system 200 in the above example.

(1) A device 213, 214, 215, 216, 217 or 218 will be in receipt, via the router, of a source message from a computer system that includes a unique subject reference. The device will also know the communications identifier for the respective interface of the router based on the received source message. For example, an SMS source message will identify the communications identifier for Wireless Interface 207.

(2) The device 213, 214, 215, 216, 217 or 218 will transmit a reply message via the Wireless Network 210, Data Network 211 or Telephone Network 212 to the router using the appropriate communications identifier for the Wireless Interface 207, E-mail Interface 208, or Telephony Interface 209. The message will contain the unique subject reference and a message payload.

(3) If the message is received on the Wireless Interface 207, it is sent to the SMS Handler 204 which converts it to a mark-up language format message that contains the message payload, communications identifier of device 213 or 214 and the unique subject reference. The message is then sent to the Message Broker 202.

If the message is received on the E-mail Interface 208, it is sent to the E-mail Handler 205 which converts it to a mark-up language format message that contains the message payload, communications identifier of device 215 or 216 and the unique subject reference. The message is then sent to the Message Broker 202.

If the message is received on the Telephony Interface 209, it is sent to the Call Handler 206 which converts it to a mark-up language format message that contains the message payload, communications identifier of device 217 or 218 and the unique subject reference. The message is then sent to the Message Broker 202.

(4) The Message Broker 202 references the communications identifier and subject reference in the mark-up language format message against the Data Store 203 to determine the communications identifier of the Computer System 200 which has received a reply. The Message Broker also copies the message to the Data Store and assigns a tag identifier associated with the respondent communications device sending the reply message.

(5) The Message Broker 202 sends the mark-up language format message, including the assigned tag identifier, to the communications identifier of the Computer System 200 via the mark-up language interface 201.

Message Transmission Between Two External Communication Devices

An example of message transmission between two external communications devices is described below. This example relates to a situation where one external communications device is the source of message that other external communications devices may wish to respond to. Thereafter the source communications device may wish to further respond to the respondent communications devices.

(1) A source device 213, 214, 215, 216, 217, 218 transmits a source message via the Wireless Network 210, Data Network 211 or Telephone Network 212 to the router using the communications identifier of the Wireless Interface 207, E-mail Interface 208, or Telephony Interface 209. The message will contain a unique subject reference for registration with communications router.

(2) The subject reference and communications identifiers of the Wireless Interface 207, E-mail Interface 208, and Telephony Interface 209 are then made available to respondent devices 213, 214, 215, 216, 217, 218 by some means, for example through a service provider.

(3) A respondent device 213, 214, 215, 216, 217, 218 will transmit a reply message via the Wireless Network 210, Data Network 211 or Telephone Network 212 to the communications router using the communications identifier of the Wireless Interface 207, E-mail Interface 208, or Telephony Interface 209. The message contains the same subject reference as the source message together with a message payload.

(4) If the message is received on the Wireless Interface 207, it is sent to the SMS Handler 204 which converts it to a mark-up language format message that contains the message payload, communications identifier of respondent device 213 or 214 and the subject reference. The message is then sent to the Message Broker 202.

If the message is received on the E-mail Interface 208, it is sent to the E-mail Handler 205 which converts it to a mark-up language format message that contains the message payload, communications identifier of respondent device 215 or 216 and the subject reference. The message is then sent to the Message Broker 202.

If the message is received on the Telephony Interface 209, it is sent to the Call Handler 206 which converts it to a mark-up language format message that contains the message payload, communications identifier of respondent device 217 or 218 and the subject reference. The message is then sent to the Message Broker 202.

(5) The Message Broker 202 assigns the communications identifier in the mark-up language format message a unique tag reference and looks up the subject reference against the Data Store 203 to determine the communications identifier of the source device 213, 214, 215, 216, 217, 218.

(6) The Message Broker 202 then sends the message containing the message payload, subject reference and tag reference to the SMS Handler 204, E-mail Handler 205, or Call Handler 206 as appropriate along with the communications identifier of the source device 213, 214, 215, 216, 217, 218.

(7) If the mark-up language format message contains an SMS identifier, the message is converted by the SMS Handler 204 to an SMS message that is transmitted to the source device 213 or 214 from the Wireless Interface 207 via the Wireless Network 210.

If the mark-up language message contains an E-mail identifier, the message is converted by the E-mail Handler 205 to an email message that is transmitted to the source device 215 or 216 from the E-mail Interface 208 via the Data Network 211.

If the mark-up language format message contains a Voice Call identifier, the message is converted by the Call Handler 206 to voice signals that are transmitted to the source device 217 or 218 from the Telephony Interface 209 via the Telephone Network 212.

(8) The source device 213, 214, 215, 216, 217, or 218 will receive the message via the anonymous communications router from the respondent device 213, 214, 215, 216, 217, or 218.

(9) To reply, the source device 213, 214, 215, 216, 217, 218 will transmit a message via the Wireless Network 210, Data Network 211 or Telephone Network 212 to the router using the communications identifier of the Wireless Interface 207, E-mail Interface 208, or Telephony Interface 209. The message will contain the subject reference, a message payload and the received tag reference.

(10) If the message is received on the Wireless Interface 207, it is sent to the SMS Handler 204 which converts it to a mark-up language format message that contains the message payload, subject reference and tag reference. The message is then sent to the Message Broker 202.

If the message is received on the E-mail Interface 208, it is sent to the E-mail Handler 205 which converts it to a mark-up language format message that contains the message payload, subject reference and tag reference. The message is then sent to the Message Broker 202.

If the message is received on the Telephony Interface 209, it is sent to the Call Handler 206 which converts it to a mark-up language format message that contains the message payload, subject reference and tag reference. The message is then sent to the Message Broker 202.

(11) The Message Broker 202 references the tag reference in the mark-up language format message against the Data Store 203 to determine the communications identifier of the respondent device 213, 214, 215, 216, 217, or 218 which has received a reply. The Message Broker also copies the message to the Data Store 203.

(12) The Message Broker 202 sends a mark-up language format message containing the message payload and subject reference to the SMS Handler 204, E-mail Handler 205, or Call Handler 206 along with the communications identifier of the respondent device 213, 214, 215, 216, 217, or 218.

(13) If the message contains an SMS identifier, the mark-up language format message is converted by the SMS Handler 204 to an SMS message that is transmitted to the respondent device 213 or 214 from the Wireless Interface 207 via the Wireless Network 210.

If the message contains an E-mail identifier, the mark-up language format message is converted by the E-mail Handler 205 to an email message that is transmitted to the respondent device 215 or 216 from the E-mail Interface 208 via the Data Network 211.

If the message contains a Voice Call identifier, the mark-up language format message is converted by the Call Handler 206 to voice signals that are transmitted to the respondent device 217 or 218 from the Telephony Interface 209 via the Telephone Network 212.

(14) Back and forth communication between the source device 213, 214, 215, 216, 217, 218 and respondent device 213, 214, 215, 216, 217, 218 may continue via the router by repeating step 3) to step 13).

Although the present invention has been described based on the above illustrated embodiment, the present invention is not limited solely to this particular embodiment.

For example, it will be understood that the unique tag assigned to a particular respondent device need only be unique for a particular subject. In this way, tags can be reused for different devices on different subjects. This further enhances anonymity, as a source device cannot determine if the same respondent device is responding on different subjects by detecting when the same tag identifier is used.

Furthermore, it will be understood that other information may also be appended to a message, in addition to the message payload. For example, it may be useful to include information as to the size of the message.

The invention claimed is:

1. A communications router for anonymously routing messages between a source communication device and one or more respondent communication devices, wherein the messages contain a subject identifier and where the router and the source and respondent communication devices each have at least one communication identifier, the communications router comprising:
   a processor executing instruction in communication with a memory storing the instructions to provide;
   a source storage for storing the at least one communication identifier for the source communication device and a predetermined subject identifier for designating messages associated with the source communication device;
   a respondent storage for storing the at least one communication identifier for each of the one or more respondent communication devices and assigning a unique tag identifier to each respondent communication device for the predetermined subject identifier;
   a first message handler for selecting received messages containing the predetermined subject identifier originating from the one or more respondent communication devices and attaching the appropriate tag identifier to each of the selected messages based on its origin, and transmitting the selected message to the source communication device using its at least one communication identifier; and
   a second message handler for receiving messages from the source communication device and transmitting them to the appropriate respondent communication device using the stored communication identifiers, the predetermined subject identifier, and the tag identifier for the appropriate respondent communication device.

2. A communications router according to claim 1, wherein the router further comprises a format identifier storage for storing format identifier data indicating the format of messages associated with the source and the respondent communication devices.

3. A communications router according to claim 2, wherein the router further comprises a converter for converting messages transmitted between the source communication device and the appropriate respondent communication device into a format compatible with the respondent communication device receiving the message based on the stored format identifier for that respondent communication device.

4. A communication router according to claim 3, wherein the converter converts messages incoming to the router into a mark-up language format.

5. A communications router according to claim 1, wherein one or more of the source communication and the respondent communication devices are located on one or more external networks, the router comprising at least one interface for connecting with said one or more external networks.

6. A communications router according to claim 5, wherein the one or more external networks comprise at least one of the following: a GSM wireless network, a data network, and a telephone network.

7. A communications router according to claim 1, wherein the router comprises an interface for connecting with a source communication device in the form of a computer system.

8. A communications router according to claim 1, wherein the messages comprise at least one of the following: a voice message, an electronic mail, and a text message.

9. A communications router according to claim 1, wherein the first message handler comprises a first incoming message handler for determining the communications identifier for the one or more respondent communications devices from incoming messages from the one or more respondent communication devices and causing said respondent storage to store said communications identifier with the assigned unique tag identifier.

10. A communications router according to claim 1, wherein the second message handler comprises a second incoming message handler for determining the communications identifier for the source communications device from incoming messages from the source communications device and causing said source storage to store said communications identifier with the predetermined subject identifier.

11. A communications router according to claim 1, wherein a data store forms said source storage and said respondent storage.

12. A communications router according to claim 1, wherein a message broker forms said first and second message handler.

13. A method for anonymously routing messages between a source communication device and one or more respondent communication devices, the messages having a subject identifier, and the source communication device and one or more respondent communication devices each having at least one communication identifier, comprising the steps of:
   storing the at least one communication identifier for the source communication device and a predetermined subject identifier for designating messages associated with the source communication device on the source communication device;
   storing the at least one communication identifier for each of one or more respondent communication devices and assigning a unique tag identifier to each respondent communication device for the predetermined subject identifier;
   selecting received messages containing the predetermined subject identifier originating from the one or more respondent communication devices and attaching the appropriate tag identifier to each of the selected messages based on its origin, and transmitting the selected message to the source communication device using its at least one communication identifier; and
   receiving messages from the source communication device and transmitting them to the appropriate respondent communication device using the stored communication identifiers, the predetermined subject identifier, and the tag identifier contained in the message for the appropriate respondent communication device.

14. A method according to claim 13, further comprising the step of storing a medium of transmission associated with each of the source communication device and one or more respondent communication devices.

15. A method according to claim 14, further comprising the step of converting the messages transmitted between the source device and the appropriate respondent communication device into a format compatible with the communication device receiving the message based on the stored medium identifier for that communication device.

16. A method according to claim 11, wherein messages incoming to the router are converted into a mark-up language format.

17. A communications system for anonymously routing messages between a source communication device and one or more respondent communication devices, wherein the messages contain a subject identifier and the router and communication devices each have at least one communication identifier, the system comprising:

a processor executing instructions in communication with a memory storing the instructions to provide;

a router comprising a first storage for storing the at least one communication identifier for the source communication device and a predetermined subject identifier for designating messages associated with the source communication device;

a transmitter for providing the one or more respondent communication devices with said predetermined subject identifier and the at least one communication identifier for said router;

the router comprising a first detector for detecting messages originating from said one or more respondent communication devices and selecting received messages containing the predetermined subject identifier;

the router comprising a second storage for storing the at least one communication identifier for each of one or more respondent communication devices and assigning a unique tag identifier to each respondent communication device for the predetermined subject identifier;

the router comprising an attacher for attaching said respective tag identifier to each selected message based on its origin respondent communication device and transmitting the message to said source communication device based on the predetermined subject identifier and using the stored at least one communication identifier for the source communication device;

the router comprising a second detector for detecting a reply message originating from the source communication devices and being directed to a particular_respondent communication device, and determining the predetermined subject identifier and unique tag identifier for the reply message; and the router having a transmitter for transmitting the reply message to the appropriate respondent communication device using the stored communication identifiers, the determined predetermined subject identifier and tag identifier for the appropriate respondent communication device.

* * * * *